(12) United States Patent
Steiner et al.

(10) Patent No.: US 10,031,217 B2
(45) Date of Patent: Jul. 24, 2018

(54) METHOD FOR OPERATING AN ULTRASONIC SENSOR AND ULTRASONIC SENSOR FOR IMPLEMENTING THE METHOD

(71) Applicant: Pepperl+Fuchs GmbH, Mannheim (DE)

(72) Inventors: Till Steiner, Roemerberg (DE); Wei Yap Tan, Mannheim (DE)

(73) Assignee: Pepperl+Fuchs GmbH, Mannheim (DE)

( * ) Notice: Subject to any disclaimer, the term of this patent is extended or adjusted under 35 U.S.C. 154(b) by 232 days.

(21) Appl. No.: 15/027,820

(22) PCT Filed: Sep. 25, 2014

(86) PCT No.: PCT/EP2014/070529
§ 371 (c)(1),
(2) Date: Apr. 7, 2016

(87) PCT Pub. No.: WO2016/050256
PCT Pub. Date: Apr. 7, 2016

(65) Prior Publication Data
US 2016/0245904 A1  Aug. 25, 2016

(51) Int. Cl.
*G01S 7/527* (2006.01)
*G01S 15/10* (2006.01)

(52) U.S. Cl.
CPC ............ *G01S 7/527* (2013.01); *G01S 15/101* (2013.01)

(58) Field of Classification Search
CPC .... G01S 7/527; G01S 15/101; A61B 1/00078
See application file for complete search history.

(56) References Cited

U.S. PATENT DOCUMENTS

| 4,858,203 A | 8/1989 | Hansen | |
|---|---|---|---|
| 5,025,778 A * | 6/1991 | Silverstein | ........... A61B 1/0008 600/104 |
| 5,506,394 A * | 4/1996 | Plesko | ..................... G02B 3/14 235/462.35 |

(Continued)

FOREIGN PATENT DOCUMENTS

WO   WO 2006/138241 A2   12/2006

OTHER PUBLICATIONS

International Searching Authority, International Search Report and Written Opinion for International Application No. PCT/EP2014/070529, dated May 7, 2015, 10 pages, European Patent Office, The Netherlands.

*Primary Examiner* — Isam A Alsomiri
*Assistant Examiner* — Amie M Ndure
(74) *Attorney, Agent, or Firm* — Alston & Bird LLP

(57) ABSTRACT

A method for operating an ultrasonic sensor with a housing and at least an ultrasonic converter comprising a surface for emitting and receiving ultrasonic waves, whereby ultrasonic waves are emitted towards an object at different points in time, whereby the ultrasonic waves being reflected from the object are received by the surface and whereby a signal 1, 2 is generated by the received ultrasonic waves is characterized in that the relative position of the surface with respect to the object is modified in such a way that the relative position is different at consecutive points in time and that the signals 1, 2 of two consecutive points in time are subtracted from each other. Further an ultrasonic sensor for carrying out the method is described.

15 Claims, 4 Drawing Sheets

Time t

(56) References Cited

U.S. PATENT DOCUMENTS

| | | | | |
|---|---|---|---|---|
| 5,601,082 A * | 2/1997 | Barlow | G01S 7/52026 | 600/443 |
| 6,036,650 A | 3/2000 | Wu et al. | | |
| 6,122,538 A * | 9/2000 | Sliwa, Jr. | A61B 8/00 | 324/207.14 |
| 6,390,370 B1 * | 5/2002 | Plesko | G02B 13/001 | 235/454 |
| 2002/0087148 A1 * | 7/2002 | Brock | A61B 17/0469 | 606/1 |
| 2002/0087166 A1 * | 7/2002 | Brock | A61B 17/0469 | 606/130 |
| 2002/0087169 A1 * | 7/2002 | Brock | A61B 17/0469 | 606/139 |
| 2002/0095175 A1 * | 7/2002 | Brock | A61B 34/20 | 606/205 |
| 2005/0027206 A1 * | 2/2005 | Ariav | G01B 21/02 | 600/529 |
| 2006/0133210 A1 | 6/2006 | Ishihara et al. | | |
| 2007/0027667 A1 * | 2/2007 | Osborn, III | A61B 5/1076 | 703/11 |
| 2007/0178768 A1 * | 8/2007 | Harshman | H01R 13/5224 | 439/660 |
| 2007/0250073 A1 * | 10/2007 | Brock | A61B 17/0469 | 606/130 |
| 2007/0250074 A1 * | 10/2007 | Brock | A61B 17/0469 | 606/130 |
| 2007/0255291 A1 * | 11/2007 | Brock | A61B 17/0469 | 606/130 |
| 2007/0260115 A1 * | 11/2007 | Brock | A61B 17/0469 | 600/114 |
| 2008/0119871 A1 * | 5/2008 | Brock | A61B 17/0469 | 606/130 |
| 2008/0167560 A1 * | 7/2008 | Thornton | A61B 8/12 | 600/467 |
| 2008/0246532 A1 * | 10/2008 | Cosper | G05D 19/02 | 327/518 |
| 2008/0287802 A1 * | 11/2008 | Li | A61B 8/00 | 600/463 |
| 2008/0287805 A1 * | 11/2008 | Li | A61B 8/0833 | 600/471 |
| 2008/0287860 A1 * | 11/2008 | Tgavalekos | A61B 5/06 | 604/22 |
| 2009/0171191 A1 * | 7/2009 | Patrick | A61B 8/00 | 600/424 |
| 2009/0171192 A1 * | 7/2009 | Patrick | A61B 8/00 | 600/424 |
| 2009/0270733 A1 * | 10/2009 | Koide | A61B 8/06 | 600/447 |
| 2009/0270737 A1 * | 10/2009 | Thornton | A61B 8/12 | 600/466 |
| 2010/0179432 A1 * | 7/2010 | Thornton | A61B 5/0095 | 600/463 |
| 2010/0179522 A1 * | 7/2010 | Companion | A61B 18/22 | 606/10 |
| 2011/0026365 A1 | 2/2011 | Beckhoven et al. | | |
| 2014/0133269 A1 * | 5/2014 | Hansen | A61B 1/00078 | 367/7 |

\* cited by examiner

METHOD FOR OPERATING AN ULTRASONIC SENSOR AND ULTRASONIC SENSOR FOR IMPLEMENTING THE METHOD

CROSS REFERENCE TO RELATED APPLICATIONS

This application is a National Stage Application, filed under 35 U.S.C. § 371, of International Application No. PCT/EP2014/070529, filed Sep. 25, 2014, the contents of which are hereby incorporated by reference in their entirety.

BACKGROUND

Related Field

The present invention relates to a method for operating an ultrasonic sensor with a housing and at least an ultrasonic converter comprising a surface for emitting and receiving ultrasonic waves, whereby ultrasonic waves are emitted towards an object at different points in time, whereby the ultrasonic waves being reflected from the object are received by the surface and whereby a signal is generated by the received ultrasonic waves.

The present invention further relates to an ultrasonic sensor for implementing the method according to one of claims 1 to 3, in particular for operation in gaseous media, with a housing and at least an ultrasonic converter comprising a surface for emitting and receiving ultrasonic waves, whereby the ultrasonic waves being reflected from an object are received by the surface and whereby a signal is generated by the received ultrasonic waves.

Description of Related Art

In recent years ultrasonic sensors are used predominantly in factory automation to measure the running time or amplitude of sonic pulses in gaseous media like air. With the widely used time-of-flight measurement procedure, the sensor emits a package of ultrasonic pulses and measures the time taken until an echo is received. A single ultrasonic converter that functions as a transmitter and receiver is normally used here.

A burst or a single pulse achieves the required resonance frequency in transmitter mode by applying voltages of up to several hundred volts to electrically stimulate the ultrasonic converter. The receiver signal with a magnitude of a few millivolts is amplified, demodulated and transmitted to a threshold detector. The distance of the object is then calculated from the duration of the sonic pulse.

A problem of the ultrasonic sensors of the state of the art lies in the fact that the same converter is used for transmitters and receivers means. After ultrasonic waves are emitted by the surface of the converter, the surface fulfills a post-pulse-oscillation. During the post-pulse-oscillation it is not possible to detect the received ultrasonic waves due to interference with said oscillations. The distance close to the sensor in which the reflecting object has to be placed in order to create this effect is hence called blind area. Therefore known ultrasonic sensors are not suitable to detect objects located close to the sensor in the blind area. Different hardware and software measures are known for reducing the size of the blind area. These measures are very complicated and therefore cost-intensive.

Further, the signals of known ultrasonic sensors are disturbed by so called virtual echoes. Virtual echoes are induced by sound waves propagating in the sensor housing and being reflected at discontinuities of the housing. The virtual echoes superimpose the real echoes and thereby disturb the sensor signals. To avoid virtual echoes it is known to create acoustic isolations of the converter from the housing. A drawback of the acoustic isolation is the complex construction which leads to an expensive assembly of the sensor.

BRIEF SUMMARY

It is therefore an object of the present invention to improve and further develop a method of the initially described type for operating an ultrasonic sensor and to improve an ultrasonic sensor for implementing the method in such a way that the blind area is shortened and that virtual echoes are avoided.

In accordance with the invention, the aforementioned object is accomplished by a method comprising the features of claim 1. According to this claim, such a method is characterized in that the relative position of the surface with respect to the object is modified in such a way that the relative position is different at consecutive points in time and that the signals of two consecutive points in time are subtracted from each other.

According to the invention it has first been recognized that the post-pulse-oscillation of the surface generates always the same signal. Further it has been recognized that the virtual echo of a sensor does not change. By modifying the relative position of the surface with respect to the object between two consecutive points in time two different signals are received by the converter. By subtracting these signals from each other the unwanted virtual echoes as well as the signal induced by the post-pulse-oscillation are deleted. The signals induced by the ultrasonic waves being reflected from an object will appear shifted but are not deleted.

Accordingly the blind area is shortened and virtual echoes are eliminated out of the signal in an easy way.

It should be noted that the relative position of the surface with respect to the object can be modified by displacing the surface or by displacing the object. It is just essential that the signals generated by the received ultrasonic waves relate to two different relative positions of the surface with respect to the object.

In a preferred manner the surface can be displaced alternately between a first position and a second position in order to modify the relative position of the surface with respect to the object. Thereby the surface is at any point in time arranged at a defined location so that the shift of the signal induced by the reflected ultrasonic waves is always defined.

With regard to an easy and accurate displacement of the surface, the surface can be displaced by mechanical or electromechanical means. Thereby the location of the surface and hence the relative position between the surface and the object can be controlled very easily.

Further the aforementioned object is accomplished by an ultrasonic sensor comprising the features of claim 4. According to this claim, such an ultrasonic sensor is characterized in that the surface is displaceable with respect to the object.

According to the invention it has been recognized that modifying the relative position of the surface with respect to the object can be achieved with easy structural means if the surface is displaceable with respect to the object. Thereby signals corresponding to different relative positions can be achieved at different points in time so that the signals can be subtracted from each other for deleting the unwanted parts of the signal.

In a preferred manner the surface can be displaceable along an emitting axis. Put another way the surface can be displaceable along the axis the ultrasonic waves are emitted by the surface. An advantage of this structural feature is that the ultrasonic sensor does not have to be aligned exactly to the object.

In order to realize an easy construction of the ultrasonic sensor the surface can be displaceable between a first position and a second position. Concretely the distance between the first position and the second position can be $n\lambda/m$, whereby n, m are natural numbers and $\lambda$ corresponds to the wavelength of the emitted ultrasonic waves. Therefore the shift of the signals is defined easily.

In a further preferred manner the surface can be displaceable by mechanical or electromechanical means. In this way the location of the surface is controlled exactly. The mechanical or electromechanical means can be realized in many ways, for example by using the piezoelectric effect, by using a mechanical oscillator or by a system depending on a magnetic field. These means are easy to realize which makes the assembly of the sensor cheaper.

There are several ways how to design and further develop the teaching of the present invention in an advantageous way. To this end it is to be referred to the patent claims subordinate to patent claim 1 on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will be explained. In the drawing

DETAILED DESCRIPTION OF VARIOUS EMBODIMENTS

Figure 1:
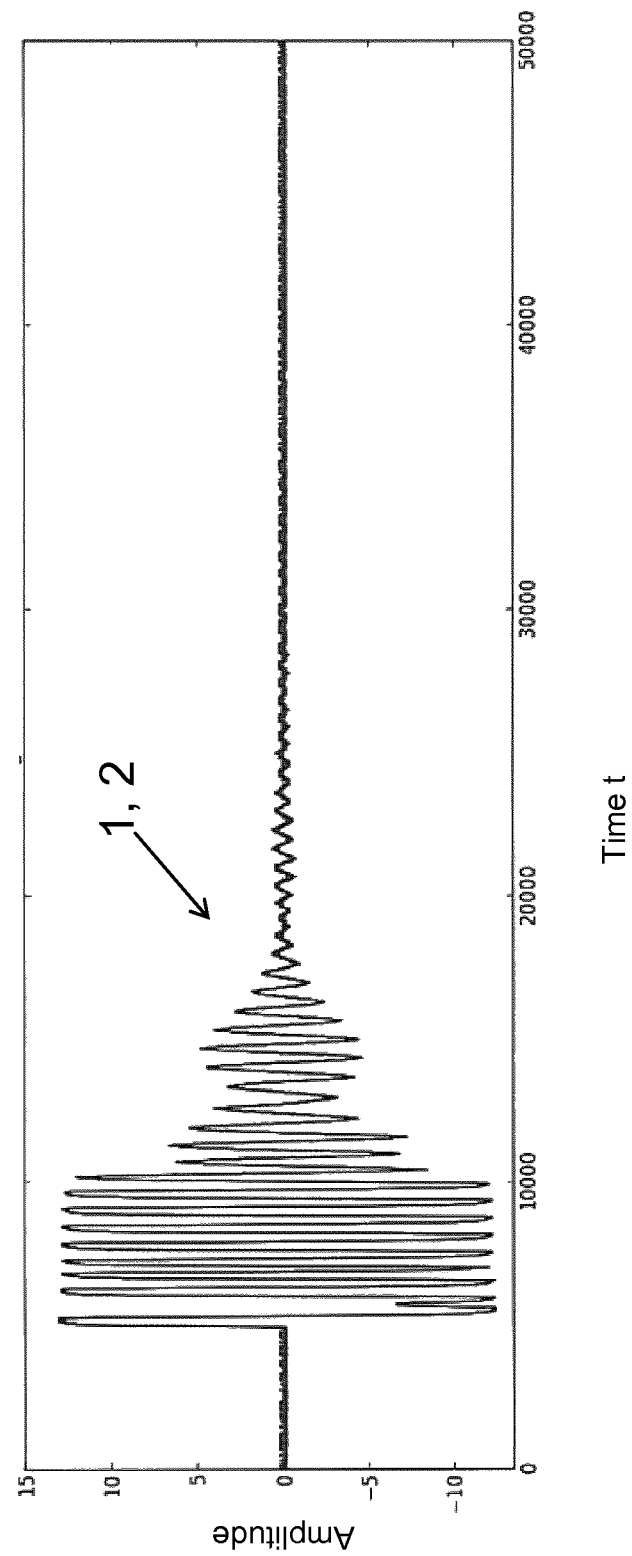
FIG. 1 is a diagram showing the signals generated at two consecutive points in time with an object being in front of the sensor.

FIG. 1 shows the signals 1, 2 generated at two consecutive points in time with an object being arranged in front of the sensor within the blind area.

At a first point in time the surface and the object are in a first relative position to each other, i.e. the surface is located at a first position. The surface emits ultrasonic waves from the first position towards an object in front of the sensor. A first signal 1 is generated by the received ultrasonic waves reflected by the object.

At a second point in time the surface and the object are in a second relative position to each other, i.e. the surface is located at a second position. In this case the surface is displaced along the emitting axis from the first position to the second position. The surface emits ultrasonic waves from the second position towards the object in front of the sensor. A second signal 2 is generated by the received ultrasonic waves being reflected by the object.

The two signals 1, 2 are shown in FIG. 1.

Figure 2:
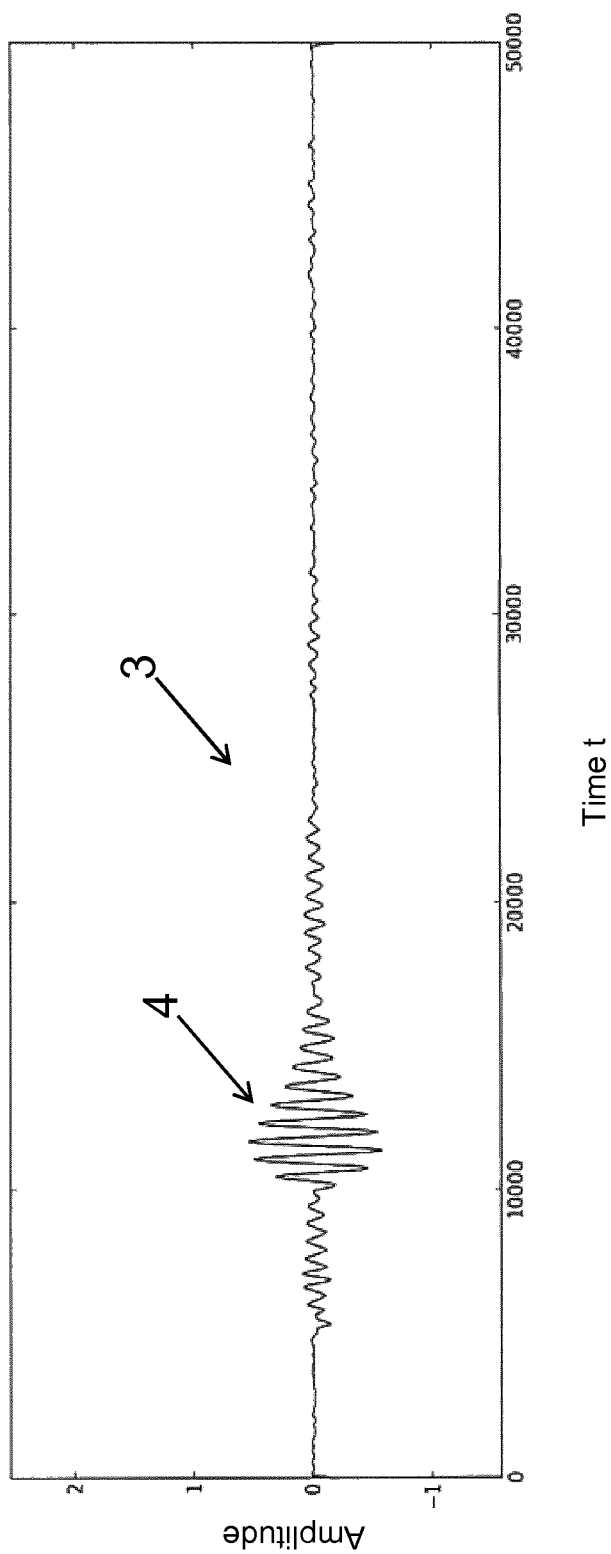
FIG. 2 is a diagram showing the difference of the two signals of FIG. 1.

FIG. 2 shows the difference 3 of signal 1 and signal 2 of FIG. 1. The echo 4 corresponding to the object in front of the sensor can be clearly seen. Further FIG. 2 shows that the difference 3 does not contain any interfering signals resulting from the object being in the blind area or from virtual echoes of the sensor housing.

Figure 3:
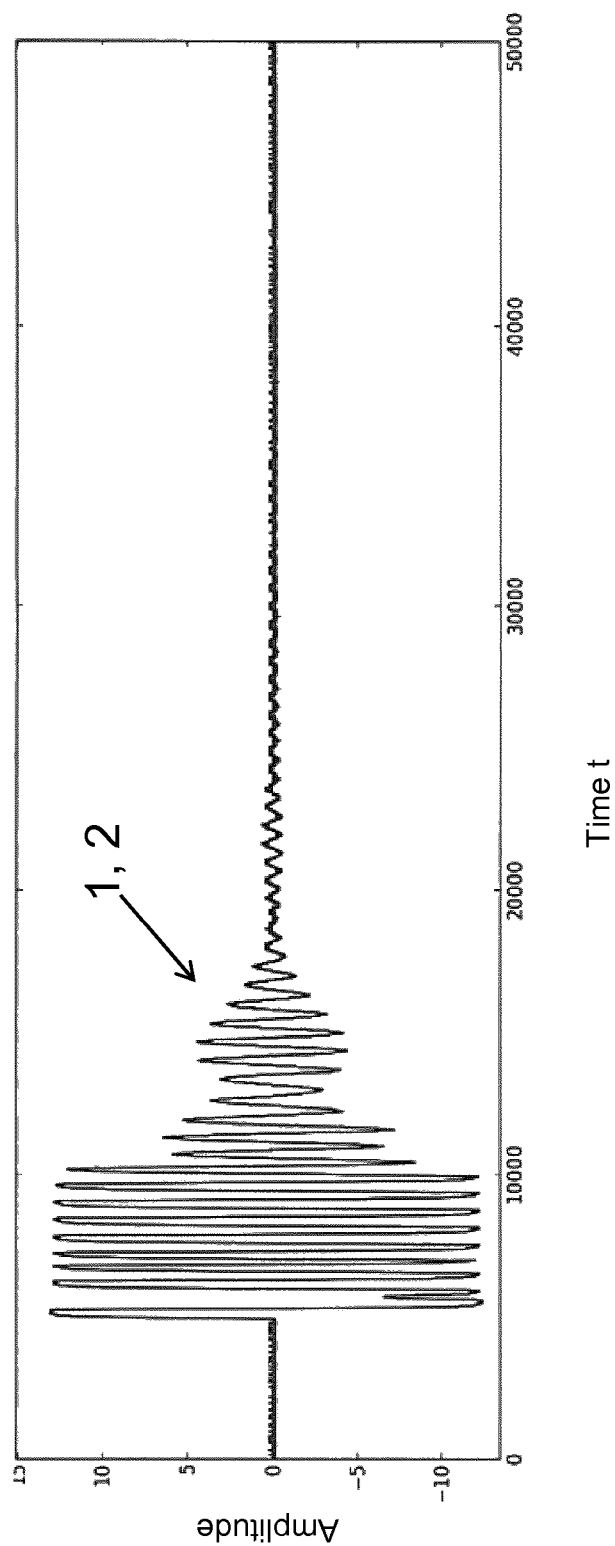
FIG. 3 is a diagram showing the signals generated at two consecutive points in time with no object being present in front of the sensor.

FIG. 3 shows the signals 1, 2 generated at two consecutive points in time with no object being arranged in front of the sensor.

At a first point in time the surface emits ultrasonic waves from a first position. Since no object is located in front of the sensor the first signal 1 merely results from post-pulse-oscillation and from virtual echoes.

At a second point in time the surface emits ultrasonic waves from a second position. Since no object is located in front of the sensor the second signal 2 merely results from post-pulse-oscillation and from virtual echoes, too.

Figure 4:
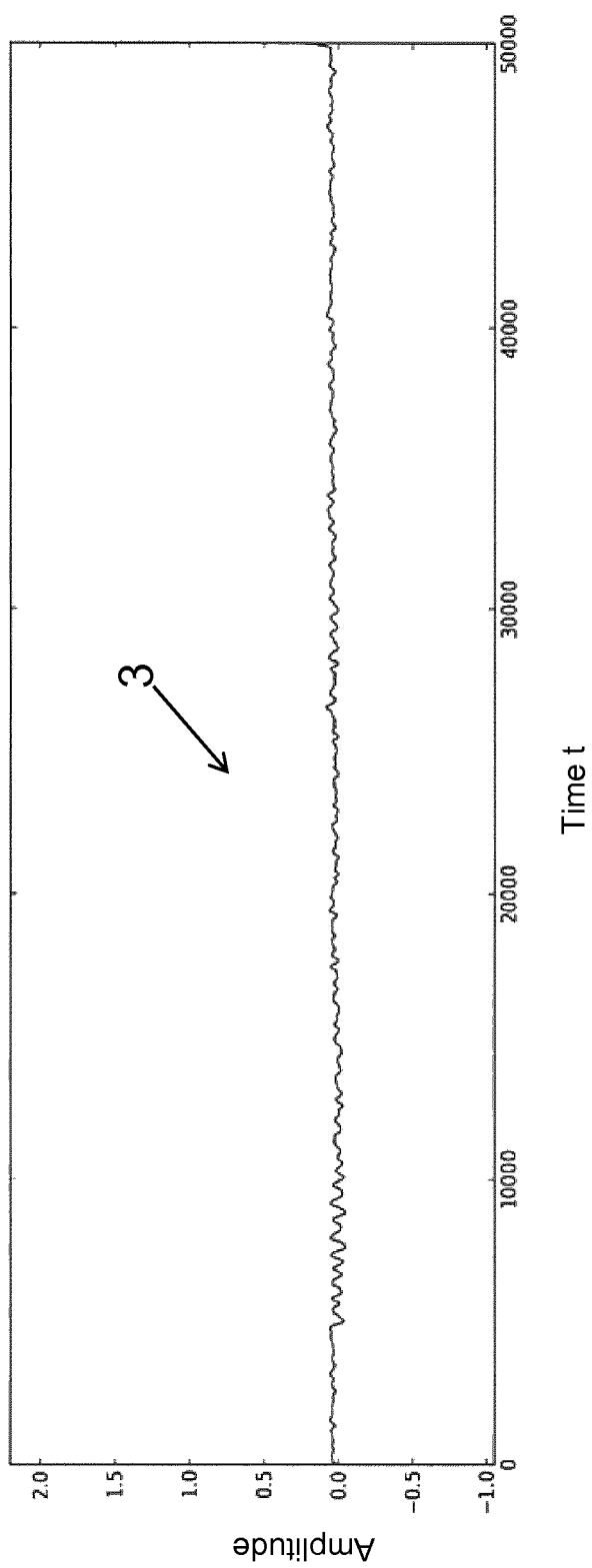
FIG. 4 is a diagram showing the difference of the two signals of FIG. 3.

FIG. 4 shows the difference 3 of signal 1 and signal 2 of FIG. 3. It can be seen that the difference 3 basically corresponds to a flatline and no echo is identifiable.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

LIST OF REFERENCE SIGNS 1 first signal
2 second signal
3 difference
4 echo

The invention claimed is:

1. Method for operating an ultrasonic sensor with a housing and at least an ultrasonic converter comprising a surface for emitting and receiving ultrasonic waves, the method comprising the steps of:
   emitting ultrasonic waves towards an object at different consecutive points in time,
   displacing the surface alternatively between a first position and a second position,
   receiving ultrasonic waves reflected from the object by the surface, and
   generating signals 1, 2 by the received ultrasonic waves, wherein the relative position of the surface with respect to the object is modified due to the displacement of the surface alternatively between the first position and the second position, such that the relative position is different at the different consecutive points in time and the signals 1, 2 of two of the different consecutive points in time are subtracted from each other.

2. Method according to claim 1, wherein the surface is displaced by mechanical or electromechanical means.

3. Ultrasonic sensor for implementing the method according to claim 1, in particular for operation in gaseous media, with a housing and at least an ultrasonic converter comprising a surface for emitting and receiving ultrasonic waves, whereby the ultrasonic waves being reflected from an object are received by the surface and whereby the signals 1, 2 is generated by the received ultrasonic waves, wherein the surface is displaceable between the first position and the second position.

4. Ultrasonic sensor according to claim 3, wherein the surface is displaceable along an emitting axis.

5. Ultrasonic sensor according to claim 3, wherein the first position and the second position are located along the emitting axis.

6. Ultrasonic sensor according to claim 5, wherein the distance between the first position and the second position is $n\lambda/m$, whereby n, m are natural numbers and $\lambda$ corresponds to the wavelength of the emitted ultrasonic waves.

7. Ultrasonic sensor according to claim 3, wherein the surface is displaceable by at least one of mechanical or electromechanical means.

8. Ultrasonic sensor according to claim 7, wherein the surface is displaceable by using the piezoelectric effect.

9. Ultrasonic sensor according to claim 7, wherein the surface is displaceable by using a driven mechanical oscillator.

10. Ultrasonic sensor according to claim 7, wherein the surface is displaceable by a system depending on a magnetic field.

11. Method according to claim 2, wherein the surface is displaceable by using the piezoelectric effect.

12. Method according to claim 2, wherein the surface is displaceable by using a driven mechanical oscillator.

13. Method according to claim 2, wherein the surface is displaceable by a system depending on a magnetic field.

14. Method according to claim 1, wherein the distance between the first position and the second position is $n\lambda/m$, whereby n, m are natural numbers and $\lambda$ corresponds to the wavelength of the emitted ultrasonic waves.

15. Method according to claim 1, wherein the surface is displaceable along an emitting axis.

* * * * *